350-377 SR
XR 3,739,359 7X 4030W WP

[redacted]
United States
Waring, Jr.

[11] 3,739,359
[45] June 12, 1973

[54] MAGNETIC BUFFER STORAGE

[75] Inventor: Robert Kerr Waring, Jr., Wilmington, Del.

[73] Assignee: E. I. du Pont de Nemours and Company, Wilmington, Del.

[22] Filed: Aug. 25, 1971
[21] Appl. No.: 174,605

[52] U.S. Cl. ..................340/174 YC, 340/174.1 M, 179/100.2 CH, 350/151
[51] Int. Cl. ........................................ G11c 11/14
[58] Field of Search ........... 340/174 YC, 174.1 M; 179/100.2 CH; 350/151

[56] References Cited

UNITED STATES PATENTS

| | | | |
|---|---|---|---|
| 3,629,517 | 12/1971 | Grimm | 179/100.2 CH |
| 3,094,699 | 6/1963 | Supernowicz | 340/174 YC |
| 3,465,311 | 9/1969 | Bertelsen et al. | 340/174 YC |
| 3,176,278 | 3/1965 | Mayer | 340/174 YC |
| 3,582,877 | 6/1971 | Benoit | 340/174 YC |

*Primary Examiner*—Stanley M. Urynowicz, Jr.
*Attorney*—D. R. J. Boyd

[57] ABSTRACT

A buffer storage system is described in which the storage element is composed of a magneto-opticmirror having a layer of a low-Curie temperature magnetic material on one face. Information can be read into the layer of low Curie temperature by thermomagnetic methods without disturbing previous information on the magneto-opticmirror, then transferred to the magnetooptic layer by a suitable transfer field (either a decaying oscillating field or a pulsed unidirectional field) at a predetermined time in response to trigger signals.

17 Claims, 2 Drawing Figures

3739359
OR IN 365/122

Patented June 12, 1973 3,739,359

2 Sheets-Sheet 1

INVENTOR
ROBERT KERR WARING, JR.
BY
D R Boyd
ATTORNEY

Patented June 12, 1973 3,739,359

2 Sheets-Sheet 2

INVENTOR
ROBERT KERR WARING, JR.
BY
DRJ Boyd
ATTORNEY

MAGNETIC BUFFER STORAGE

FIELD OF THE INVENTION

This invention relates to the buffer storage of information, more particularly this invention relates to the recording of patterns of magnetization on a recording member and periodic transfer or framing of the pattern onto a receptor member adjacent thereto which store this information while further information is being read into the recording member.

BACKGROUND OF THE INVENTION

Visual or optical images have been recorded in magnetic form on a magnetic medium. U.S. Pat. No. 2,915,594 to Burns et al. and U.S. Pat. No. 2,793,135 to Sims, Jr., et al. show the recording of patterns on a magnetic medium.

One type of apparatus for reading these images out of the magnetic tape makes use of a magneto-optic effect. Such a read-out apparatus is shown in U.S. Pat. No. 3,229,273 to Baaba et al. The Baaba et al. patent shows a magnetic transfer surface positioned adjacent the magnetic tape. The magnetic fields due to local surface magnetization of primary images recorded on the tape magnetize the corresponding areas of the transfer surface to produce a secondary magnetic image in this surface. The secondary image is converted to an optical image by applying plane polarized light to the surface. The plane of polarization of the incident light is rotated upon reflection from the magnetized surface. The sense of rotation is dependent upon the direction of magnetization of the surface.

In the Baaba et al. patent, the longitudinal magnetic Kerr effect is utilized for magneto-optic read-out. Other Kerr effects and the Faraday effect may be utilized in the read-out system. Magneto-optic effects such as these are described in "Magnetic Domains and Techniques for Their Observation," R. Carey and E. D. Isaac, Academic Press, New York, 1966, Chapter 5, pp. 62–80.

Buffer storage systems are employed when information is received at one rate, and read-out at another rate. For example, in the transmission of visual images, the transmission may be relatively slow to utilize a narrow band width and maintain a high signal to noise ratio, but it may be desired to view the picture as a whole. Again, information may be received in the form of rapid, periodic bursts, as with some types of computer output, which are required to be stored between bursts for viewing, photographic recording and the like.

SUMMARY OF THE INVENTION

The present invention is a method and apparatus for the buffer storage of information in the form of frames of electronic information from an information source, including triggering signals to define the frames.

A compound recording member is employed consisting of a first magnetic layer, preferably of a finely particulate hard magnetic material of low Curie temperature, and a second magnetic mirror layer adjacent to the first layer, the second layer having a magnetically hard metal with a coercivity less than the magnetic material of the first layer and having a thickness less than 1,000 A.

The magnetic material of the first layer is generally first switched to a predetermined magnetic state (either magnetized or demagnetized) by transiently heating the layer to the vicinity of the Curie temperature under magnetic field conditions corresponding the desired state, in response to a triggering signal. The first magnetic layer is then imagewise magnetized by a combination of heating transiently with radiant energy and magnetic field conditions, the combination being modulated by information signals from the information source. The image thus produced is transferred to the second magnetic layer by applying a burst of magnetic field of the compound member in response to a triggering signal from the information source. The transfer magnetic field should have a maximum intensity less than the coercivity of the first magnetic layer. Preferably the transfer magnetic field is a decaying oscillating magnetic field having a maximum amplitude greater than the coercivity of the second magnetic layer and less than that of the first magnetic layer.

The information transferred to the second magnetic layer is read out by directing a beam of polarized light onto the second magnetic layer, and passing the reflected light through an analyzer. The plane of polarization of the reflected light is rotated to a degree which depends on the state of magnetization of the surface element from which it is reflected. Accordingly, there is produced an optical image corresponding to the information magnetically impressed on the second magnetic layer.

The steps of the recording and transfer can then be repeated. During the repetition of the recording operation the state of magnetization of the second layer is unchanged, i.e., any prior image is retained on the second layer for read-out. In subsequent recording, the entire surface of the first magnetic layer can be brought to a uniform state of magnetization prior to recording, as in the initial case. Alternatively, only selected portions of the prior recording can be changed.

With respect to recording, a number of variations can be employed.

i. The recording member is initially magnetized and is thermally imagewise demagnetized by scanning with a spot of radiation having a maximum intensity sufficient to demagnetize the magnetic material, the intensity and position of the spot being modulated in accordance with the information.

ii. The recording member is initially magnetized and is scanned with a spot of radiation. A weak magnetic bias field is applied having the same direction as the direction of initial magnetization, which is modulated in accordance with the information. When the magnetic bias field is applied, no demagnetization occurs. When the field is absent, the recording member is demagnetized by the spot.

iii. The recording member is initially magnetized. A bias field is applied to oppose the magnetization and the recording member is scanned with a spot of radiation whose intensity is modulated with a maximum in the vicinity of the Curie temperature, whereby an imagewise pattern of reverse magnetization is formed.

iv. The recording member is premagnetized and scanned with a spot of constant intensity while the bias field is modulated from the direction of initial magnetization to the opposite direction, whereby the magnetization is unchanged when the field is in the same direction as the initial magnetization of the member, and is reversed when the field is opposed to the direction of initial magnetization.

v. The recording member is initially unmagnetized and is scanned with an intensity modulated spot of radiation having a maximum value sufficient to raise the temperature of the recording member to the vicinity of the Curie temperature in the presence of a constant bias field whereby the recording member is magnetized in those areas heated to the vicinity of the Curie temperature.

vi. The recording member is initially unmagnetized and is scanned with a spot of radiation of intensity sufficient to raise the magnetic material to the vicinity of the Curie temperature in the presence of a modulated bias field whereby the recording member is magnetized at locations where the field is applied and remains unmagnetized when no field is applied.

In the above techniques either the bias field or the intensity of a spot of radiation which is scanned over the surface of the recording member is modulated to record the signals. It will be evident that combinations of intensity and bias field modulation can also be employed in the practice of this invention. It is also evident that all or part of the elements of an entire optical image or frame can be recorded simultaneously by a transient thermal image.

The radiation which is scanned in the form of a small area on the surface of the recording member can be light, including infrared, visible and ultraviolet light which is absorbed by the magnetic material of the first magnetic layer and is thereby capable of heating the same. However, in the practice of this invention, it is preferred to employ an electron beam as the source of radiation since such beams are readily scanned and modulated in intensity, and can readily supply sufficient heating.

The process of the invention is limited by the thermal diffusion of the heated area on the magnetic recording member. For this reason, it is preferred to employ particulate magnetic material for the recording member, which is bound to the second magnetic layer with a binder of low thermal conductivity. Preferably, the thickness of the layer of magnetic material should be less than 1 mil, and most preferably from 0.5 to 0.2 mils. The heat is then conducted through the second, mirror layer to a support (such as a glass prism) on which the layers are deposited in preferance to lateral diffusion. For the same reason, the rate of scan should be sufficiently great so that the duration of heating is less than about 1 millisecond for an increment of resolution.

THE DRAWINGS AND DETAILED DESCRIPTION OF THE INVENTION

This invention will be better understood by reference to the drawings which occupy this specification. In the drawings.

Figure 1:
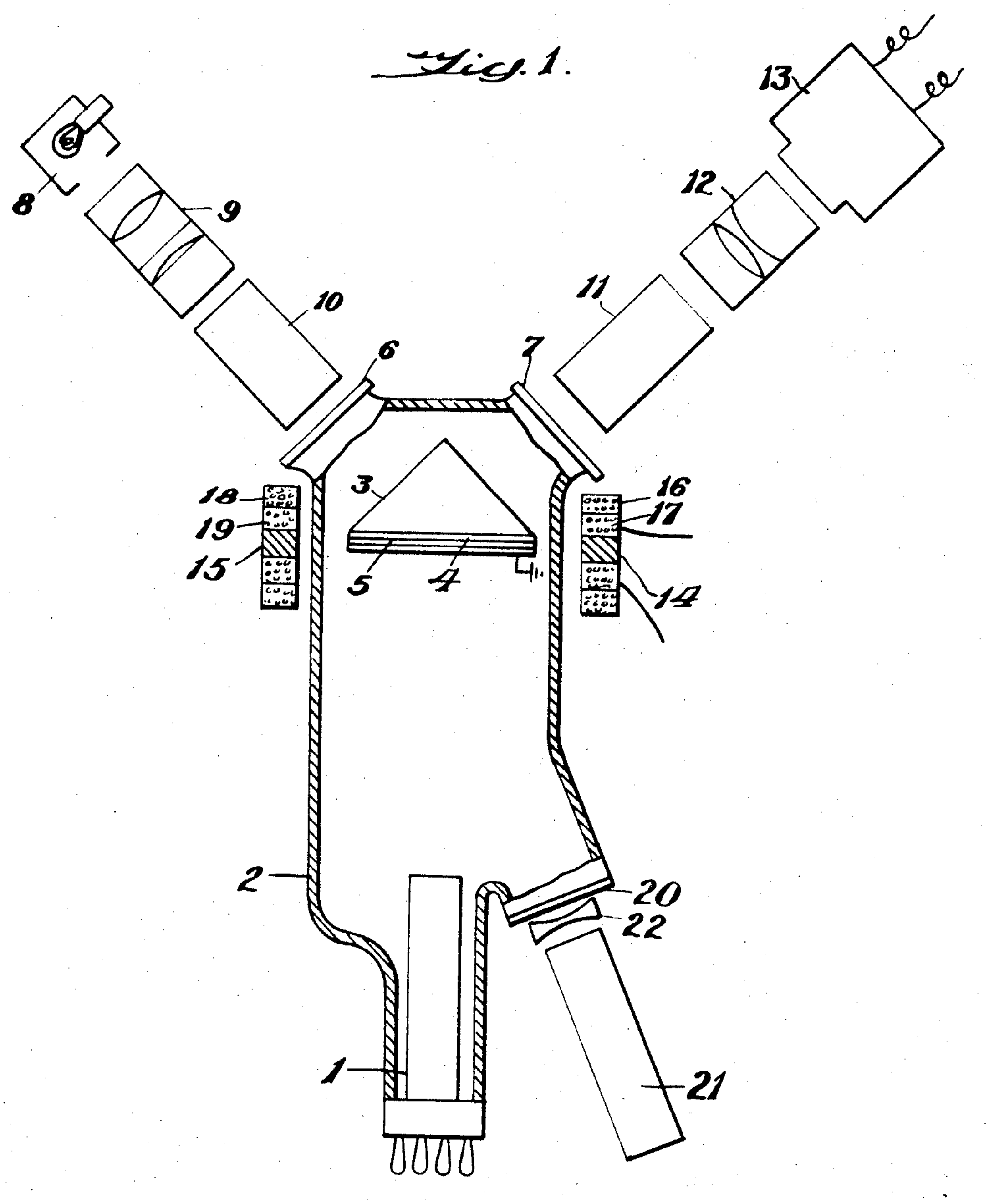
FIG. 1 is a view, in section of a cathode ray tube with a compound recording member and optical read-out for use in buffer storage.

Referring now to the drawing, FIG. 1, an electron gun 1 comprising a cathode, grid, first and second anodes, and horizontal and vertical deflection plates if fitted at one end of an evacuated glass envelope 2. At the other end of the envelope is an assembly comprising an optical prism 3 having a thin mirror film of a magnetic metal such as an iron/-cobalt alloy deposited on its face to form a magnetic receptor member 4. On top of the magnetic receptor member and facing the electron gun, is a layer composed of ferromagnetic, essentially single domain, acicular particles of chromium dioxide in a binder to form a thermomagnetic recording member, 5. Optical windows 6 and 7 are fitted in the evacuated glass envelope 2 parallel to the faces of the prism 3 to provide optical access to the magnetic mirror member deposited on the face of the prism. The readout system comprises a lamp 8, a collimator 9, and a polarizer 10 which direct a parallel beam of polarized light onto the mirror member 4 through window 6 and the face of prism 3. The light reflected and modulated by mirror member 4 passes through the prism and window 7, through an analyzer 11, and is focussed by a lens system 12 onto the face of a video detector 13 such as a vidicon tube. The polarizer 10 and the analyzer 11 can be Glan-Thomsen prisms. If the magneto-optic receptor member has a high conversivity, which can be provided by the addition of suitably designed dielectric layers between the magnetic mirror member 4 and the magnetic recording member 5, then polarizing films such as those sold under the trademark Polaroid can be used. Two coils, each having a ferrite core 14, 15 and two sets of windings 16, 17 and 18, 19 are disposed outside the glass envelope 2 with the axes of the cores 14, 15 disposed on a line substantially in the plane of the compound magnetic member 4 and 5, and adapted to produce a substantially uniform field across the mirror member 4 and the recording member 5. A third optical window 20 is set in the envelope 2 adjacent to the electron gun 1 which is located to permit substantially uniform illumination of the magnetic recording member 5 by a high intensity light source such as a pulsed laser or a xenon flash lamp 21, the light from source 21 being defocussed to cover the magnetic recording member 5 by the lens 22. The lamp must provide sufficient radiation in the form of a pulse to heat the magnetic particles of which the magnetic recording member 5 is composed to a temperature above the Curie temperature. Accordingly, it is desirable that the magnetic material of the recording member have a Curie temperature less than 500°C. and preferably from 75°– 250°C.

Information can be recorded onto the recording member 5 of FIG. 1 by thermomagnetic recording in several ways which have been discussed hereinabove.

TABLE I

| Initial State | Radiation Scan write | Radiation Scan blank | Bias write | Bias blank | Magnetic Record Signal | Magnetic Record FIELD |
|---|---|---|---|---|---|---|
| MAG | ON | OFF | 0 | → | 0 | +M |
| MAG | ON | → | 0 | $+H_b$ | 0 | +M |
| MAG | ON | OFF | $-H_b$ | → | −M | +M |
| MAG | ON | → | $-H_b$ | $+H_b$ | −M | +M |
| DEMAG | ON | OFF | $+H_b$ | → | +M | 0 |
| DEMAG | ON | → | $+H_b$ | 0 | +M | 0 |

In all of the methods of read-in, the formation of an image on the magnetic recording member depends on cooperation between the heat image created by the scanning electron beam and the local magnetic field, including the externally applied bias field and the local field of surrounding portions of the magnetic recording member. The various combinations of thermal and magnetic modulation are shown in Table I. In Table I the beam "on" means that the intensity and duration of the exposure is sufficient to raise the local temperature of the magnetic recording member to at least the vicinity of the Curie temperature. The recording member is magnetized in the +M direction, and the bias field $+H_b$ is directed in the same direction as the magnetization. The strength of the bias field should be less than the coercivity of the magnetic mirror member to avoid interfering with any image thereon.

By the application of heat, the coercivity of the recording member is decreased to a small value at which the field due to adjacent particles or a small bias field can alter the state of magnetization of the recording member. Because the thickness of the magnetic mirror member is small ($<$ 1,000 A) the magnetic field of the magnetic mirror layer at the recording member is insufficient to affect the recording. On the other hand, the receptor surface has a substantial coercivity, and is not affected by the magnetic field of images recorded as a pattern of magnetization on the recording member until an appropriate bias of magnetic field is applied. The use of a very thin magnetic mirror layer is particularly adapted to magneto-optic read-out, and in particular, to the utilization of optical matching techniques to increase the conversivity of the magneto-optic layer.

In a preferred embodiment of this invention, the transfer to the magnetic image on the magnetic recording layer to the magnetic mirror layer employs a process known as anhysteretic magnetization.

Anhysteretic magnetization is a well-known phenomenon described, for example, in "The Physics of Magnetic Recording," C. D. Mee, Interscience Publishers, New York, 1964, Chapter 2, pp. 24 – 26. Briefly, an oscillating field which diminishes from a maximum value to a minimum value is applied by the framing coils 17 and 19 to the magnetic mirror 4. A unidirectional field, which is the local surface field of a point of the image on the recording layer, is also applied to the magnetic mirror.

The term "magnetic image" is intended to mean a pattern of magnetization spatially corresponding to an image on an otherwise unmagnetized recording member or layer, or on a member magnetized in the direction opposite to the elements forming the image.

Typically, magneto-optic mirror layers are films which possess an easy axis of magnetization in the plane of the film. Each part of the magnetic mirror is fully magnetized, generally along the easy axis of magnetization. Magnetic images on a mirror member are defined by areas of magnetization oppositely directed to the area or areas forming the background of the image. In contrast, the recording members composed of fine magnetic particles can be considered to be demagnetized over areas embracing a number of particles and can be partially or fully magnetized in any desired direction to form a stable magnetic pattern. This is true even though, due to orientation of the particles, the recording layer or stratum can be more readily magnetized in one direction.

In the light of the above, while it is possible to record a continuous tone image on a layer composed of magnetic particles, such a continuous tone image cannot be created on a magnetic mirror. In order to store and transfer apparently continuous tone images, it is necessary to divide the image into discrete areas and modulate the area of magnetized, demagnetized or reverse magnetized magnetic material in proportion to the tonal intensity to be represented, i.e., to employ halftoning techniques such as are used in the graphic arts.

In transferring the image from the recording layer to the magnetic mirror by anhysteretic transfer techniques a burst of an oscillating, decaying magnetic field is applied which is preferably directed along the easy axis of magnetization of the mirror member 4 but can be at an angle, including a right angle thereto. The initial intensity of the burst is sufficient to drive the magnetic material of the magnetic mirror about a major hysteresis loop. Subsequent cycles drive the magnetic material about minor hysteresis loops which are displaced from the origin of the hysteresis loop by the applied local magnetic field of the recording layer. Transfer occurs when the sum of the framing field and the applied local field from the recording member exceeds the coercivity of the mirror member. Thus with a preferably uniform field, and a perfectly uniform recording member, very small fields could be transferred with a single pulse. In practice, the field is not uniform nor is the magneto-optic surface perfect, so that the level at which transfer takes place differs in differing parts of the magneto-optic receptor member. The apparent level thus is a range rather than a unique value.

The anhysteretic framing pulse cannot transfer magnetic images having a field strength less than half the decrement in magnetic field between successive half cycles of the pulse. If the image to be transferred is a half-tone image in which the "dark" parts of the image are represented by small "white" areas on a "black" ground an likewise the "light" areas of the image are represented by small "black" areas on a "white" ground, the magnetic field between such small areas is small, even though the change in magnetization which differentiates black and white is large. Consequently, the smaller the decrement in magnetic field between cycles of the pulse, the greater the tonal range of a halftone image (or similarly the spatial resolution of a black on white or a white on black image) which can be transferred, up to a point determined by the response of the magneto-optic receptor member at any point. With good magneto-optic surfaces, this is about 2 oe.

In order to take account of the point-to-point variation of magnetic field strength and inhomogeneity of the magneto-optic surface, a number of cycles of magnetic fields are employed, the decrement between cycles being determined by the small field difference needed to achieve transfer of the desired tonal range, and the minimum total change being determined by the range in the apparent level at which transfer takes place.

As another modification, the applied field parallel to the easy axis of magnetization of the receptor member 4, may be a unidirectional field. However, in this case, the unidirectional field must be less than the coercivity of the receptor member 4. In this case, the unidirectional field is applied strictly as a bias which makes it possible for the local surface field from the tape to change the magnetization of the receptor member. That is, the sum of the local surface field and the applied unidirectional bias field are sufficient to change the magnetization of the receptor member, but either of these fields applied individually would not change the magnetization. In this case, the unidirectional field is applied first in one direction which exceeds the coercivity of the receptor member in order to erase the previous image and prepare the receptor member for the new image, then the polarity of the applied unidirectional field is reversed to a level less than the coercivity of the receptor member. This field, in conjunction with the local surface field from the tape, changes the magnetization of the receptor member if the local surface field is in the same direction as the applied unidirectional field.

In accordance with another aspect of the present invention, a secondary magnetic image is impressed upon the mirror lay 4 by applying a single unidirectional field pulse having an amplitude substantially greater than the anisotropy field of the magnetic mirror. The unidirectional field is applied perpendicular to the easy axis of magnetization of the magnetic mirror 4 and in the plane of the thin film receptor member.

Techniques are known for affecting the magnetization of a thin film by applying an oscillating or unidirectional field transverse to the easy axis of magnetization. Such techniques are disclosed, for example, in T. S. Crowther, Journal of Applied Physics, Vol. 34, page 580, (1963).

The duration of the magnetic field transfer burst must exceed the switching time of about $10^{-9}$ seconds, but otherwise is not critical. When a sequence of images is to be viewed, it is desirable that the transfer burst has a duration of less than $10^{-3}$ seconds (the flicker limit). Bursts having a duration of $5 \times 10^{-5}$ secs. can be readily achieved.

The transfer bursts are applied in response to triggering signals which can be transmitted with the information signals. A block diagram of suitable circuitry for recording and transferring signals is shown in FIG. 2.

Figures 2, 2A:
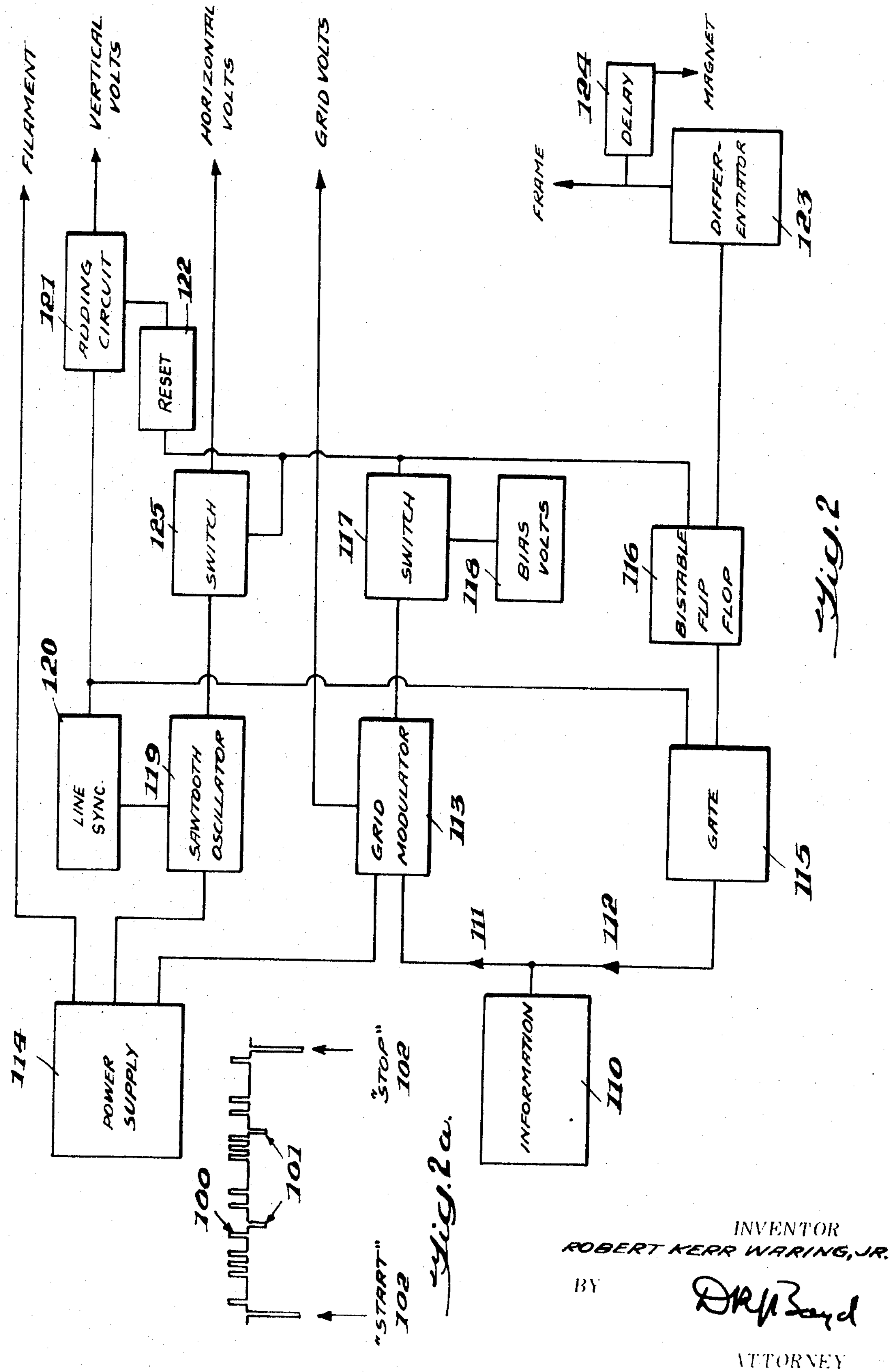
FIG. 2 is a diagram showing electrical circuitry which can be employed with the apparatus of FIG. 1 to record information reversed in the form of a sequence of electronic signals.

FIG. 2 is a block diagram of electronic circuitry for use with the apparatus of FIG. 1 for reading in a sequence of electronic signals. The signals are provided by an information, or picture transmitting equipment wherein a line scan is transmitted, the lines being in the form of black or white segments indicated by "signal" and "no signal," the segments being of essentially constant amplitude but of varying duration. The information may be provided in a rapid burst which is to be read in then transferred and read out while the record member is refreshed and awaits the arrival of a subsequent burst of information, as for example with the output from a computer. Alternatively, the information may be received slowly, the lines being stored on the recording member and read out when the transmission is completed. The information will be coded with start and stop signals, and also with line marker signals. For transmission, the signals may be employed to modulate one or more carrier frequencies which are subsequently demodulated at the receiving equipment according to the techniques which are well known in the art. A type of signal suitable for use with the circuit of FIG. 2 is shown in FIG. 2*a* wherein the information signals 100 are positive pulses, the "line" marker signals 101 are negative pulses, and the "stop" and "start" signals 102 are negative pulses having substantially greater amplitude than the line marker signals.

Referring now to FIG. 2, the information source supplying signals as shown in FIG. 2*a* is indicated by 110. The information signals are separated from the line, stop and start signals by rectifiers 111 and 112. The information signals pass to circuit 113 where they are employed to modulate the grid voltage supplied by power supply 114 for application to the grid of the electron gun of FIG. 1. Thus the signal voltages modulate the intensity of the electron beam above and below the level required for thermomagnetic modification of the magnetic state of the recording layer 5 of FIG. 1.

The "start" and "stop" signals are identified by the gate 115 and applied to a symmetrical trigger of a bistable flip-flop circuit 116. On receipt of the "start" signal, the flip-flop is set to condition A. In this condition the flip-flop operates an electronic switch circuit 117 to cut off a blanking voltage from a voltage source 118 which is applied to the grid circuit, thus allowing the electron beam current to rise to a level at which the recording member is affected. At the same time, the electronic switching circuit 125 is opened so that the output of the sawtooth oscillator 119 is applied to the horizontal deflection plates of the cathode ray tube of FIG. 1. The sawtooth oscillator is synchronized with the line marker pulses from the gate 115 by the synchronizing circuit 120. The line marker pulses are also fed to an adding circuit 121 which supplies the voltage to the vertical deflection plates of the cathode ray tube, so that each line is displaced from the preceding line. The adding circuit is reset by circuit 122 when the bistable flip-flop 116 starts in condition A. When the "stop" pulse is received switching circuit 117 is opened and switching circuit 118 is closed. The start of condition B is detected by a differentiating circuit 123, the pulse from the differentiating circuit can be applied to trigger an anhysteretic framing circuit to transfer the completed information recorded on the magnetic recording member to the receptor member where it is read out. The pulse from differentiating circuit 123 is also fed to a delay circuit 124 where it is delayed for a time somewhat longer than the time required for the framing burst and is then employed to trigger the flash lamp 21 of FIG. 1 and the magnets 16 and 18 of FIG. 1 to prepare or refresh the recording member 5 ready to receive further information.

In order to read each transferred image, plane polarized light is incident through the prism on the surface of the magnetic mirror film opposite to the surface in contact with the magnetic layer 5, in an area substantially equal to the area of each primary image. A relatively small size, powerful source of light 8 emits a beam of light. The size of the source must be small, as close to a point source as possible, so that the collimator lens 9 will produce an optimally parallel beam which is applied to the polarizer 10. The plane polarized light from polarizer 10 is incident upon the magnetic mirror 4. The angle of incidence shown in the drawings is not necessarily the correct angle, but this angle can be adjusted by a person of ordinary skill in accordance with the reflecting characteristics of the ferromagnetic film 4. Examples of components which are suitable for use to produce the plane polarized light beam are:

light source 8 — G.E. type CM 1630 collimator lens 9, 18 mm diameter, focal length 30 mm polarizer 10 - Polaroid HN22 film The light is reflected to form a visible image of the receptor surface which is projected onto an image detector 13.

The reflected light is modulated by the magneto-optic effect of the magnetic thin film mirror on the incident light. In the particular example described, the longitudinal Kerr magneto-optic effect has been utilized. In making use of the longitudinal Kerr effect the plane of incidence of the illuminating light always contains the easy axis of magnetization of the receptor surface.

The visible image is formed by light reflected and modulated by the ferromagnetic mirror film 4 which has passed through the analyzer 11 and image forming lens 12. The image forming lens 12 should be adjusted so that the image of the magnetic thin film receptor surface is applied to the active element of the image detector 13. Image detector 13 may be an image orthicon tube, vidicon tube, or apparatus for forming a photographic image of the visible image formed by the image forming lens 12. Alternatively, image forming lens 12 can be adjusted to form an image which can be viewed with the human eye.

The polarizer 10 is oriented to produce polarized light which has a plane of polarization which is transverse to the plane of incidence. The angle of the plane of polarization of the reflected light is rotated, by the Kerr effect, with respect to the angle of the plane of polarization of the incident light. The direction of rotation will depend upon the polarity of magnetization. For example, if a region of the receptor member is magnetized to positive saturation, the light reflected from that region will have its plane of polarization rotated a given amount in one direction with respect to the plane of polarization of the incident light. If the region is magnetized to negative saturation, then the light reflected from that region will be shifted by the given amount in the other direction with respect to the plane of polarization of incident light.

For optimum contrast in the image, the analyzer 11 is oriented so that light reflected from the region of the receptor member which has been magnetically saturated in one direction displays maximum contrast with light that has been reflected from a region of said receptor surface which has been magnetically saturated in the other direction. The analyzer 11 may be, for example a disc of Polaroid HN22 film.

The buffer storage system described above has the advantage that information can be received and stored at any rate and also updated while earlier received information remains undisturbed for read-out on the receptor surface.

Buffer storage is useful where the information arrival rate is inappropriate, such as too fast or too slow, for human appreciation or where information is recorded sequentially which it is desired to view as a whole. Thus the electronic output of a computer may be recorded as a burst of electronic signals which can be read rapidly into the storage member and thereafter transferred to the receptor surface for viewing at leisure while the recording member is refreshed and awaits the arrival of a subsequent burst of information. Alternately, read-in may be relatively slow such as the electronic information supplied by a facsimile transmission system. The process of slowly transmitting information with buffer storage at the recovery end can be considered as a method of 'band width compression', because the frequency band necessary for transmission in this manner is less than that required when all of the information must be transmitted at a rate sufficiently fast to eliminate optical flicker phenomena. Thus the use of such storage element in television broadcasting band width requirements by reducing the number of frames per second which are necessary for smooth rendition of motion.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. Apparatus for the buffer storage of information comprising:

i. a compound magnetic member having a first magnetic layer of a hard magnetic material and a second magnetic mirror layer having a thickness less than 1,000 A adjacent said first layer having magnetic properties including a coercivity greater than the magnetic field of signals recorded on said first magnetic layer but less than the coercivity of said first magnetic layer, said second mirror layer being within the local field generated by magnetic signals on said first magnetic layer;

ii. thermomagnetic means to form magnetic images corresponding to information on said first magnetic layer without affecting said magnetic mirror layer;

iii. means to apply magnetic fields to said compound magnetic member, including transfer means for intermittently applying bursts of magnetic field to said compound member in response to triggering signals to transfer magnetic images from said first magnetic layer to said mirror layer;

iv. triggering means for triggering said transfer means; and v. means to read out magnetic signals on said second magnetic mirror layer.

2. Apparatus of claim 1 wherein said means to form magnetic images comprises an electron beam directed on said first magnetic layer, means to apply a bias magnetic field to said first magnetic layer, and means to modulate said electron beam and said magnetic bias means whereby a magnetic image is formed by the combined action of heating by the electron beam and the bias magnetic field.

3. Apparatus of claim 2 in which the means to read out the magnetic signals on said mirror layer comprises a source of polarized light adapted and arranged to project polarized light onto the surface of the mirror layer opposite said first magnetic layer, whereby the polarization of the light is modulated by the magneto-optic effect on reflection from said mirror layer, and means to detect the modulation of the polarization of the light reflected by said mirror layer from said source.

4. Apparatus of claim 3 in which said mirror layer has an easy axis of magnetization and the magnetic image is formed by modulation of the magnetization of said first magnetic layer in the plane of said first magnetic layer and parallel to the easy axis of magnetization.

5. Apparatus of claim 4 in which said biasing means is adapted and arranged to apply bursts of magnetic field to the said compound magnetic member directed along the easy axis of magnetization of said mirror layer.

6. Apparatus of claim 5 in which said bursts consists of a decaying oscillating magnetic field which has a field strength which is gradually reduced from a maximum level substantially producing magnetic saturation of said mirror layer to a minimum level which is below the coercivity of said mirror layer, whereby said mirror layer is remanently magnetized imagewise in accordance with the local surface field applied to said mirror layer by said first magnetic layer at the time of said burst.

7. Apparatus of claim 6 additionally comprising means to premagnetize said first magnetic layer.

8. Apparatus of claim 7 wherein said means to premagnetize said first magnetic layer includes radiant electromagnetic energy means to transiently heat the magnetic material of said first magnetic layer to the vicinity of the Curie temperature and means to apply a magnetic field to said first magnetic layer during the transient heating.

9. The apparatus of claim 4 in which said biasing means is adapted and arranged to produce bursts of magnetic field directed in the plane of the mirror layer and perpendicular to the easy axis of magnetization of said mirror layer.

10. Apparatus of claim 9 in which said bursts consist of a decaying oscillating magnetic field which has a field strength which is gradually reduced from a maximum level substantially producing magnetic saturation of said mirror layer to a minimum level which is below the anisotropy field of said mirror layer, whereby said mirror layer is remanently magnetized imagewise in accordance with the local surface field applied to said mirror layer by said first magnetic layer at the time of said burst.

11. Apparatus of claim 10 additionally comprising means to premagnetize said first magnetic layer.

12. Apparatus of claim 11 wherein said means to premagnetize said first magnetic layer includes radiant electromagnetic energy means to transiently heat the magnetic material of said first magnetic layer to the vicinity of the Curie temperature and means to apply a magnetic field to said first magnetic layer during the transient heating.

13. A method for the buffer storage of information which comprises;

transiently heating a first magnetic layer of a compound recording member with a modulated beam of radiation under magnetic field conditions whereby a magnetic image corresponding to said information is recorded as a pattern of magnetization on said recording member, said compound recording member comprising a first hard magnetic layer and a second mirror magnetic layer having a thickness of less than 1,000 A and having a coercivity less than the coercivity of said first magnetic layer, disposed in the magnetic field of said first magnetic layer;

said magnetic conditions consisting of magnetic fields less than the coercivity of said second layer, said heating being to the vicinity of the Curie temperature whereby the coercivity of said first magnetic layer is transiently reduced to a value below the strength of said fields, and applying a burst of electromagnetic radiation to said compound recording member whereby the magnetic image on said second magnetic layer is imagewise magnetized corresponding to the image on said first magnetic layer; said image on said second magnetic layer being retained while a subsequent image is recorded on said first magnetic layer, reflecting a beam of polarized light from said second magnetic layer and detecting the imagewise modulation of the plane of polarization of light reflected from said second mirror layer by the pattern of magnetization thereon.

14. Method of claim 13 wherein said first magnetic layer is premagnetized and said magnetization is recorded by modulating the intensity and position of said beam of radiation in accordance with said information.

15. Method of claim 14 wherein a magnetic field having a strength less than the coercivity of said second mirror layer and opposed to the premagnetization of said first magnetic layer is applied to said compound magnetic recording member during said heating.

16. Method of claim 13 wherein said first magnetic layer is initially unmagnetized and said information is recorded by modulating the intensity and position of said beam of radiation in accordance with said information while applying a magnetic field having a strength less than the coercivity of said second magnetic layer to said compound recording member.

17. Method of claim 13 wherein said beam of radiation is scanned spatially on said recording member, while applying a magnetic field having a maximum strength less than the coercivity of said second magnetic layer to said recording member and modulating said magnetic field in accordance with said information.

* * * * *